United States Patent Office.

DANIEL JAY BROWNE, OF CAMBRIDGE, AND STEUBEN T. BACON, OF BOSTON, MASSACHUSETTS.

*Letters Patent No. 61,313, dated January 22, 1867; antedated January 14, 1867.*

IMPROVEMENT IN THE MANUFACTURE OF BRANDY.

*The Schedule referred to in these Letters Patent and making part of the same.*

TO ALL WHOM IT MAY CONCERN:

Be it known that we, DANIEL JAY BROWNE, of Cambridge, in the county of Middlesex, and Commonwealth of Massachusetts, and STEUBEN T. BACON, of Boston, in the county of Suffolk, and Commonwealth aforesaid, have discovered and invented a new and useful Improvement in the Manufacture of Brandy from *Sorghum saccharatum*, or from the sirup of the same, and native American grapes, which may be described and explained as follows:

The newly expressed juice of the sorghum is first to be converted into a bright, aromatic, honey-like sirup by any approved process in practice or at present known. The sirup is then mixed with a suitable quantity of water and yeast, or other ferment, to reduce it to a due degree of acidity, by fermentation, in closed casks or vats, provided within with coils or tubes for regulating the temperature of the fermenting liquids or "beer," by the introduction of cold or hot water or steam. The mixture is next run into a still, and rapidly wrought off, *in vacuo*, at a proportionately high boiling point, in order that the distillate may "come over" more fully charged with essential oil and the other volatile and fragrant principles of the sirup, and thus possess, in a higher degree, that peculiar aroma and flavor so desirable to retain. This first distillate is then to be returned to the same still, or, if more convenient, to another, and "carried over" again, *in vacuo*, at a somewhat lower temperature than before, the first run or discharge being taken off as "high wine," and the second run of the still as "low wine." Any deficiency in the strength of the second run may be brought up to "proof," or higher, if desirable, by an addition from the first run, which should always be over "proof." In this state the brandy is to be "coopered" up, properly fined, and kept in the "wood" until required for bottling or other use.

To continue the process with the view of making a superior brandy, possessing a remarkably rich and delicate flavor and "bouquet," and highly conducive, as a medicine, to health, native American grapes, cultivated or wild, are to be collected at the proper season, at a suitable degree of maturity, their skins broken, and the more liquid portions of their juice separated, by pressure or otherwise, from their skins and pulps. The juice thus separated may be converted into a palatable and wholesome wine, (and subsequently, if desirable, distilled into brandy,) by blending and fermenting, in closed casks or vats, after having been mixed with water and grape-sugar (glucose) in the following proportions:

|  | Parts by volume. |
|---|---:|
| Pure grape juice | 111 |
| Water | 111 |
| Glucose, or sorghum sirup, weighing about 11 pounds to a gallon | 22 |
|  | 244 |

As soon as the active fermentation is complete, this mixture is to be tightly bunged up in clean casks, stored away in a moderately cool, dry cellar until about mid-winter, and then racked off into clean casks, properly fined, and allowed to remain in the wood until bottled or otherwise used. The grape skins and pulps from which the juice above named has been separated are next to be packed in casks of suitable dimensions, allowed to ferment a few hours, and sorghum brandy, as manufactured by the process detailed above, added to the casks containing the grape skins and pulps, until full, said skins and pulps to remain in this condition, closely bunged up, until ready for the still, which may be protracted, if necessary, for many months. The contents of these casks are now to be diluted with a suitable proportion of water, run into the still, and rapidly wrought off, *in vacuo*, in the same manner and for similar objects as above specified for the distillation of sorghum sirup. This first distillate is next to be returned to the still, and in a like manner "carried over" again *in vacuo* at a somewhat lower temperature than the preceding distillation, the first run taken off as "high wine," and the subsequent run of the still as "low wine." Any deficiency in the strength of this second run may also be brought up to "proof," or higher, if desirable, by an addition from the first run, which should always be above "proof." The two runs, thus mixed, may now be coopered up in clean casks, where they may remain in a moderately warm place until required for blending and fining with the sorghum brandy, above described, designed for a beverage or other medical use.

What we claim as our invention, and desire to secure by Letters Patent, is—

1. The blending of brandy, or spirits, distilled from sorghum sirup with brandy distilled from fermented grape juice, water, and sorghum sirup, or glucose, substantially as herein set forth.

2. In the production of brandy from the combination of the above-named materials, we also claim the mode of fermenting in close casks, or vats, furnished with tubes or coils within, for regulating the temperature of the liquids, while fermenting, substantially as herein specified.

3. In the production of brandy from the above-named ingredients, as necessary to secure success, we also claim the process of distilling *in vacuo*, substantially as and for the purposes herein described.

D. JAY BROWNE,
STEUBEN T. BACON.

Witnesses:
WILLIAM T. TOWNE,
ISAAC HULL WRIGHT.